Sept. 16, 1941.            J. G. ROBB                 2,255,898
     JUNCTION AND SWITCHING ARRANGEMENT FOR HIGH FREQUENCY CABLES
                        Filed Nov. 1, 1938
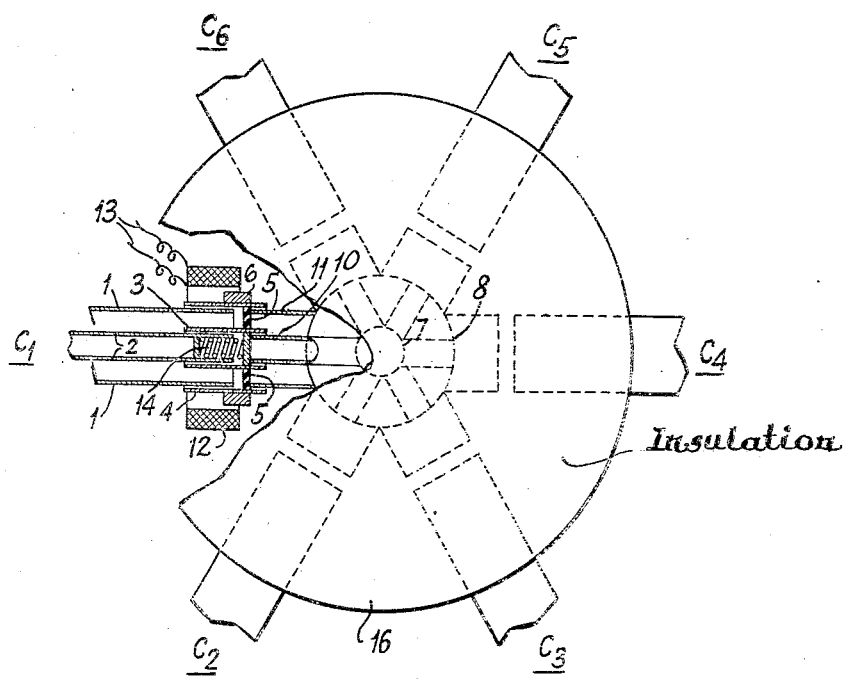
INVENTOR
JOHN GLOVER ROBB
BY
ATTORNEY Patented Sept. 16, 1941

2,255,898

UNITED STATES PATENT OFFICE 2,255,898

JUNCTION AND SWITCHING ARRANGEMENT FOR HIGH FREQUENCY CABLES

John Glover Robb, Richmond, England, assignor to Radio Corporation of America, a corporation of Delaware Application November 1, 1938, Serial No. 238,190
In Great Britain November 18, 1937

9 Claims. (Cl. 200—111)

This invention relates to junction and switching arrangements for high frequency cables and more particularly for high frequency cables of the concentric type such as are commonly employed for feeding radio frequency energy.

It is often required to connect a main concentric feeder to a plurality of branch concentric feeders—for example to connect a main feeder from a central station to one or more branch feeders leading to separate aerial systems—by connection apparatus operable from a distance. The present invention seeks to provide improved means for satisfying this requirement, without involving the use of complex or bulky apparatus at the points of connection and at the same time avoiding the production of reflection waves at the points of junction.

According to this invention an arrangement for connecting any one or more of a plurality of branch high frequency cables to a main high frequency cable is characterized in that the connection ends of the former cables are arranged radially or substantially in a circle, and the corresponding connection end of the main cable is arranged substantially centrally at right angles to the plane of said branch connection ends, the ends of the branch cables being provided with extension members which constitute electrical continuations of their respective cables and are mechanically movable longitudinally with respect thereto and the said end of the main cable being provided with connection members adapted to cooperate with said extension members so that when said extension members are in extended position they make connection with the respective connection members. Alternatively, the extension members may be associated with the main cable and the branch cable provided with the cooperating connection members. The required mechanical movement of the extension members may be remotely controlled in any convenient desired manner, e. g. by solenoid means.

The invention is illustrated in the accompanying drawing which shows, partly in section, with the insulating cover body broken away, one embodiment.

Referring to the drawing, each of a plurality of branch high frequency cables generally designated $C_1$, $C_2$—$C_6$ of the concentric type has its end arranged at a different point on a common circle and the outer and inner conductors 1, 2 of each said cable are fitted with conductive sleeves 3, 4 in electrical contact with the respective conductors and longitudinally slidable with respect thereto. The two sleeves 3, 4 on each cable are mechanically fixed together by suitable insulating means 5 so as to constitute, with said means, a mechanically unitary extension member. As shown, each sleeve 3, 4 is fitted outside its appropriate conductor 1, 2, and the insulating means 5 are, of course, fitted beyond the end of the cable proper. The outer sleeve 4 carries an armature 6 of ferro-magnetic material on the outside. A main concentric feeder 7, 8 is arranged with its end centrally of the above mentioned circle and extending at right angles to the plane thereof. Concentric members 10, 11 electrically connected to the conductors 7, 8 of the main feeder are provided, the said members being positioned and otherwise adapted to cooperate with the tubular sleeves 3, 4. Instead of using sleeve and tube connector arrangements, as illustrated, other suitable connector arrangements may be employed, for example, butt contacts e. g. copper gauze faced butt contacts could be used. A solenoid winding 12, energizable from a distance over leads 13, is provided to cooperate with each armature 6 to move the appropriate extension member in one direction, movement in the other being obtained by a second solenoid or, as illustrated, by a spring 14. The advantage of this arrangement of solenoids and armatures is that the spaces between the sleeves and between the feeder conductors are left free of the apparatus for moving the said sleeves. 16 is an insulating body or cover.

As will be seen, with the above arrangement any one (or more) of the branch cables may be connected to the main cable as desired by moving the appropriate extension member to cause its sleeves to enter the appropriate tubular members.

Energization of the solenoid winding 12 will, of course, simultaneously retract sleeves 3, 4 axially along conductors 1, 2 out of engagement with conductors 11, 10, thus disconnecting branch cable $C_1$ from the main concentric feeder 7, 8. When the solenoid winding 12 is de-energized, the pressure of spring 14 causes sleeves 3, 4 to engage conductors 11, 10, thus connecting them to conductors 1, 2 of the branch cable $C_1$. Since each of the cables $C_1$—$C_6$ are similarly equipped, any desired one or more of the branch cables may be selectively connected to the main feeder 7, 8 by appropriate energization of the associated solenoid 12.

Having now particularly described and ascertained the nature of my said invention and in what manner the same is to be performed, I declare that what I claim is:

1. An arrangement for connecting one high frequency cable to another comprising a pair of sleeves constituting electrical continuations of the conductors of said one cable, said sleeves being axially along said one cable and adapted in their extended position to engage corresponding conductors from said other cable and means for simultaneously extending said sleeves and means for retracting said sleeves.

2. An arrangement for connecting one high frequency cable to another comprising a pair of sleeves constituting electrical continuations of the conductors of said one cable, said sleeves being movable axially along said one cable and adapted in their extended position to engage corresponding conductors from said other cable, said sleeves being secured together by an insulating support, a spring for extending said sleeves, an armature carried by said sleeves and a solenoid adapted to attract said armature and retract said sleeves.

3. An arrangement for connecting a coaxial high frequency cable having an inner conductor and an outer sheath to another similar cable comprising a pair of sleeves constituting electrical continuations of the conductor and sheath of said one cable and adapted in their extended position to engage corresponding conductors from said other cable, means for simultaneously extending said sleeves and means for retracting said sleeves.

4. An arrangement for connecting a coaxial high frequency cable having an inner conductor and an outer sheath to another similar cable comprising a pair of longitudinally movable sleeves constituting electrical continuations of the conductor and sheath of said one cable and adapted in their extended position to engage corresponding conductors from said other cable, said sleeves being secured together by an insulating support, a spring for extending said sleeves, an armature carried by said sleeves and a solenoid adapted to attract said armature and retract said sleeves.

5. An arrangement for connecting any one or more of a plurality of branch high frequency cables to a main cable, said branch cables being arranged substantially radially in a plane about a central point and the end of said main cable arranged centrally and at right angles to said plane comprising connection members arranged in coaxial alignment with the conductors of each of said branch cables and connected to the conductors of said main cable and sleeves constituting electrical extensions of the conductors of each of said branch cables, said sleeves being movable axially along said branch cables and adapted in their extended positions to engage corresponding connecting members, means for extending said sleeves and means for retracting said sleeves.

6. An arrangement for connecting any one or more of a plurality of branch high frequency cables to a main cable, said branch cables being arranged substantially radially in a plane about a central point and the end of said main cable arranged centrally and at right angles to said plane comprising connection members arranged in coaxial alignment with the conductors of each of said branch cables and connected to the conductors of said main cable and sleeves constituting electrical extensions of, and carried by, the conductors of each of said branch cables, said sleeves being movable axially along said branch cables and adapted in their extended positions to engage corresponding connecting members, the sleeves associated with each branch cable being mechanically connected by an insulating bridge, means for extending said sleeves and means for retracting said sleeves.

7. An arrangement for connecting any one or more of a plurality of branch high frequency coaxial cables each comprising an inner conductor and an outer sheath to a main cable likewise comprising an inner conductor and an outer sheath, said connection members being arranged in coaxial alignment with the conductor and sheath of each of said branch cables and connected to the conductor and sheath of said main cable, sleeves constituting electrical extensions of the conductor and sheath of each of said branch cables, said sleeves being movable axially along said branch cables and adapted in their extended position to engage corresponding connection members, the sleeves associated with each branch cable being mechanically connected by an insulating bridge, means for extending said sleeves and means for retracting said sleeves.

8. An arrangement for connecting any one or more of a plurality of branch high frequency coaxial cables each comprising an inner conductor and an outer sheath to a main cable likewise comprising an inner conductor and an outer sheath, said branch cables being arranged substantially radially in a plane about a central point and the end of said main cable arranged centrally and at right angles to said plane, connection members arranged in coaxial alignment with the conductor and sheath of each of said branch cables connected to the conductor and sheath of said main cable, sleeves constituting electrical extensions of the conductor and sheath of each of said branch cables, said sleeves being movable axially along said branch cables and adapted in their extended position to engage corresponding connection members, means for extending said sleeves and means for retracting said sleeves.

9. An arrangement for connecting any one or more of a plurality of branch high frequency coaxial cables each comprising an inner conductor and an outer sheath to a main cable likewise comprising an inner conductor and an outer sheath, said branch cables being arranged substantially radially in a plane about a central point and the end of said main cable arranged centrally and at right angles to said plane, connection members arranged in coaxial alignment with the conductor and sheath of each of said branch cables connected to the conductor and sheath of said main cable, longitudinally movable sleeves constituting electrical extensions of the conductor and sheath of each of said branch cables, said sleeves being adapted in their extended position to engage corresponding ones of said connection members, the sleeves associated with each branch cable being mechanically connected by an insulating bridge, a spring associated with each of said branch cables for extending said sleeves associated therewith, an armature carried by each of said sleeves and a solenoid surrounding each of said branch cables and adapted to attract said armature and retract said sleeves.

JOHN GLOVER ROBB.